United States Patent
Wolters et al.

(10) Patent No.: US 6,378,511 B1
(45) Date of Patent: Apr. 30, 2002

(54) SYSTEM AND METHOD FOR PREPARING AN AIR/FUEL MIXTURE

(75) Inventors: Leo Wolters, Rhoon; Frank De Boer, Rotterdam, both of (NL)

(73) Assignee: Petrocare B.V., Rotterdam (NL)

( * ) Notice: Subject to any disclaimer, the term of this patent is extended or adjusted under 35 U.S.C. 154(b) by 0 days.

(21) Appl. No.: 09/553,560

(22) Filed: Apr. 20, 2000

(30) Foreign Application Priority Data

Apr. 20, 1999 (NL) .............................................. 1011844

(51) Int. Cl.$^7$ ................................................ F02B 13/00
(52) U.S. Cl. ........................................ 123/575; 123/525
(58) Field of Search ................................ 123/525, 527, 123/575, 576, 577, 578, 304, 672

(56) References Cited

U.S. PATENT DOCUMENTS

| | | | |
|---|---|---|---|
| 4,364,364 A | * 12/1982 | Subranmaniam | 123/527 |
| 4,416,244 A | * 11/1983 | McDonald | 123/577 |
| 4,846,134 A | * 7/1989 | Perry et al. | 123/520 |
| 5,070,850 A | 12/1991 | Davis et al. | 123/527 |
| 5,150,685 A | * 9/1992 | Porter et al. | 123/478 |
| 5,251,438 A | * 10/1993 | Ishida et al. | 60/274 |
| 5,353,765 A | * 10/1994 | Saikalis et al. | 123/438 |
| 5,479,906 A | 1/1996 | Collie | 123/525 |
| 5,911,210 A | 6/1999 | Flach | 123/527 |
| 6,092,364 A | * 7/2000 | Stellwagen | 60/39.463 |

FOREIGN PATENT DOCUMENTS

| | | |
|---|---|---|
| DE | 43 21 893 A1 | 1/1995 |
| DE | 297 14 887 U1 | 11/1997 |
| WO | WO 95/35441 | 12/1995 |

* cited by examiner

Primary Examiner—Henry C. Yuen
Assistant Examiner—Mahmoud Gimie
(74) Attorney, Agent, or Firm—Young & Thompson

(57) ABSTRACT

Method and system for processing an irregular gas flow which may contain a fuel. This gas flow is supplied to an internal-combustion engine, the fuel which may be present being utilized to good effect and the environment being exposed to the minimum possible pollution from hazardous substances. An auxiliary fuel is provided for any further support. According to the invention, a regulating arrangement is provided, by which the amount of auxiliary fuel can be controlled as a function of the operating conditions of the engine. Moreover, there is a regulating arrangement which is able to control the primary gas flow. The regulating arrangement is designed in such a manner that it is attempted to use as little auxiliary fuel as possible. In the most optimum scenario, no auxiliary fuel is used.

7 Claims, 2 Drawing Sheets

SYSTEM AND METHOD FOR PREPARING AN AIR/FUEL MIXTURE

BACKGROUND OF THE INVENTION

The present invention relates to a fuel supply system for a throttle-controlled internal-combustion engine.

U.S. Pat. No. 5,070,850 describes a combustion engine which is designed in particular for the combustion of methane. Since the supply of this gas is irregular, it is proposed to implement a supply of secondary fuel. This consists of an LPG.

An irregular supply of primary, possibly fuel-containing, flow gas is obtained in all kinds of processes. Examples which may be mentioned are all kinds of biogas installations and chemical installations in which vapours are released which may contain combustible products. According to the simplest solution which is known in the prior art, gases of this nature are exhausted to the atmosphere in a way which is not environmentally friendly and/or introduced into the atmosphere with the aid of a chimney, a pilot flame being present at the end of the chimney to burn off any fuel. In this way, the fuel is not burnt in a useful way.

In an improved design which is known in the prior art, a primary gas flow of this nature is supplied to an internal-combustion engine. The mechanical energy generated using this combustion engine may, for example, be used to generate electricity or can be utilized to good effect in some other way. Often, it is desirable for an internal-combustion engine of this nature to be allowed to run continuously with the same output. Since the composition and quantity of the primary gas flow fluctuates considerably, an auxiliary fuel, which is preferably introduced in the gaseous state, is used. Examples of auxiliary fuels of this nature are natural gas and propane, but obviously liquid fuels, such as petrol and the like, may also be used. The supply of an auxiliary fuel of this nature is regulated on the basis of the operating characteristics of the engine. In a particularly simple design, a λ probe is arranged in the exhaust of the combustion engine, controlling the control valve for the auxiliary fuel in such a manner that the engine always runs in the optimum range. The primary gas flow is admitted into the inlet of the combustion engine without restriction. Naturally, the inlet of the combustion engine may contain a throttle valve, depending on the type of combustion engine. However, if the primary gas flow contains a particularly high level of fuel, the mixture formed is too rich. This is because the supply of the primary gas flow cannot be controlled using the control valve for the auxiliary fuel. This problem can be avoided by designing the mixer where the primary fuel is mixed with air in such a manner that there is always an excess of air. However, this means that the combustion engine has to be designed for particularly large quantities of fuel, which are generally not present in the primary gas flow, so that in practice secondary or auxiliary fuel, except in exceptional circumstances, always has to be supplied to the combustion engine.

Moreover, as a safety measure it is specified that the control valve for the supply of auxiliary fuel may never be fully closed, since if the composition of the auxiliary fuel changes quickly, it is possible that the control unit will not react sufficiently quickly, so that 10–15% of the fuel is always auxiliary fuel.

This means that combustion engines of this nature are always running to a substantial degree on auxiliary fuel, which, of course, is not the intention. In fact, the aim is for an internal-combustion engine to be operated using whatever fuel is present in the primary gas flow.

In contrast to the supply of methane, in burn-off installations, for example, the problem exists that the primary fuel, in addition to forming an irregular supply, may also have a highly irregular composition. It is quite possible for this fuel to be particularly lean.

In such a case, in the prior art the primary supply of fuel with a low calorific value is interrupted, and operation takes place exclusively using secondary fuel.

If such a situation is impermissible, a larger combustion engine is selected, which is designed in such a manner that optimum operating conditions always prevail with the existing supply of air and a maximum supply of secondary fuel and a primary fuel which is as lean as possible. In practice, this means that a combustion engine of this nature is almost always operated using secondary fuel, which is undesirable.

SUMMARY OF THE INVENTION

The object of the present invention is to eliminate the drawbacks of the prior art described above and to provide a system for preparing an air/fuel mixture in which the minimum possible auxiliary fuel is used and, on the other hand, optimum combustion is ensured even with a primary fuel with a particularly low calorific value.

In a fuel supply system, this object is achieved by the fact that the system comprises a throttle-controlled internal-combustion engine, comprising an inlet pipe for supplying an air/fuel mixture to the said engine, in which a throttle valve is arranged, a feed for primary fuel and a feed for secondary fuel being connected to the said inlet pipe, and sensor means being present, which determine the combustion conditions of the said internal-combustion engine and are connected to a control unit, by means of which a control valve for the secondary fuel is controlled, characterized in that at least one further control valve is arranged in the air inlet duct upstream of the said throttle valve, which control valve is controlled by the said control unit.

According to the present invention, it is possible to completely or partially shut off the air supply separately. In such a state, it is possible for the lean primary fuel in the most extreme case to be the only product which is supplied to the combustion engine or to be supplied only in combination with secondary fuel. This lean fuel has in practice often been found to contain sufficient oxygen to allow combustion to take place. Supply of additional air is no longer used, or is used to a lesser extent. As a result, the combustion engine can be of much smaller size while still ensuring that combustion takes place to a sufficient extent. On the other hand, with a structure of this nature there is less need to use secondary fuel, with the result that the overall consumption of secondary fuel falls considerably while maintaining the same output.

The supply of inlet air can be regulated with the aid of a valve. However, it is also possible to control the supply of the primary gas flow and the inlet air with the aid of a three-way valve, so that a substantially constant amount of gas is always supplied to the combustion engine, with the composition (air/fuel) of this gas always being optimized to the greatest possible extent. With a structure of this nature, it is no longer necessary to use auxiliary fuel in the event of a primary gas flow which contains particularly little fuel as a result of too much inlet air being supplied.

According to an advantageous embodiment of the invention, use is made of a double closed regulating circuit in which the valve for the supply of the primary gas flow is incorporated.

As a result of the primary gas flow being restricted, it is possible, in the event of a peak supply of primary gas containing large quantities of fuel, to filter out this peak using the control valve, so that the combustion engine can be designed for a lower maximum load. Moreover, as a result it is possible to regulate the operation of the combustion engine using only the primary gas flow. This means that in one regulating method during start-up the valve for the supply of primary fuel is fully opened and the control valve for the auxiliary fuel regulates operation. If more fuel is supplied to the combustion engine via the primary gas flow, the control valve for the auxiliary fuel closes. In contrast to the prior art, it closes completely. From that moment, the "closed regulating circuit" for the auxiliary fuel is deactivated and the second "closed regulating circuit" is engaged, in which the valve for the supply of primary fuel regulates the operation of the combustion engine in conjunction with the sensor.

It will be understood that the term "sensor for regulating the operation of the internal-combustion engine" can be understood to mean any sensor which is known in the prior art. An exhaust-gas sensor was mentioned as one possible example above. However, it is also possible to determine the output of the combustion engine in any way and/or to use other parameters which are characteristic of the way in which the combustion engine is operating.

In the system described above, the primary gas flow is mixed with air from the air inlet with the aid of a mixing device. The mixing ratio in a mixing device of this nature may be a fixed ratio. This has the drawback that, if the ratio between the amount of air and fuel in the primary gas flow changes considerably, it is not corrected with regard to the amount of air introduced from the environment via the inlet. This is because the mixing device meters on the basis of gas quantities rather than gas composition. As a result, in extreme cases it may be necessary for the valve for the primary gas flow to be closed slightly and the control valve for the auxiliary fuel to be opened.

According to the present invention, it is also possible to arrange a buffer in the supply of the primary gas flow. This makes it possible to compensate for irregularities in the supply of the primary gas flow.

As has already been indicated above, the supply for primary fuel is preferably connected to a chemical installation and is used to burn off gases.

The invention also relates to a method for preparing an air/fuel mixture which is to be administered to a throttle-controlled internal-combustion engine, an irregular supply of primary, optionally fuel-containing, flow gas and, if appropriate, a supply of secondary fuel being supplied to the said combustion engine, the combustion conditions of the internal-combustion engine being determined by a sensor and controlled by the said sensor, the supply of secondary auxiliary fuel being regulated on this basis, the mixture flow supplied being metered by means of the throttle valve, in which method the air flow supplied is regulated separately by the said sensor.

BRIEF DESCRIPTION OF THE DRAWINGS

The invention will be explained in more detail below with reference to exemplary embodiments illustrated in the drawing, in which.

DESCRIPTION OF ILLUSTRATED EMBODIMENT

Figure 1:
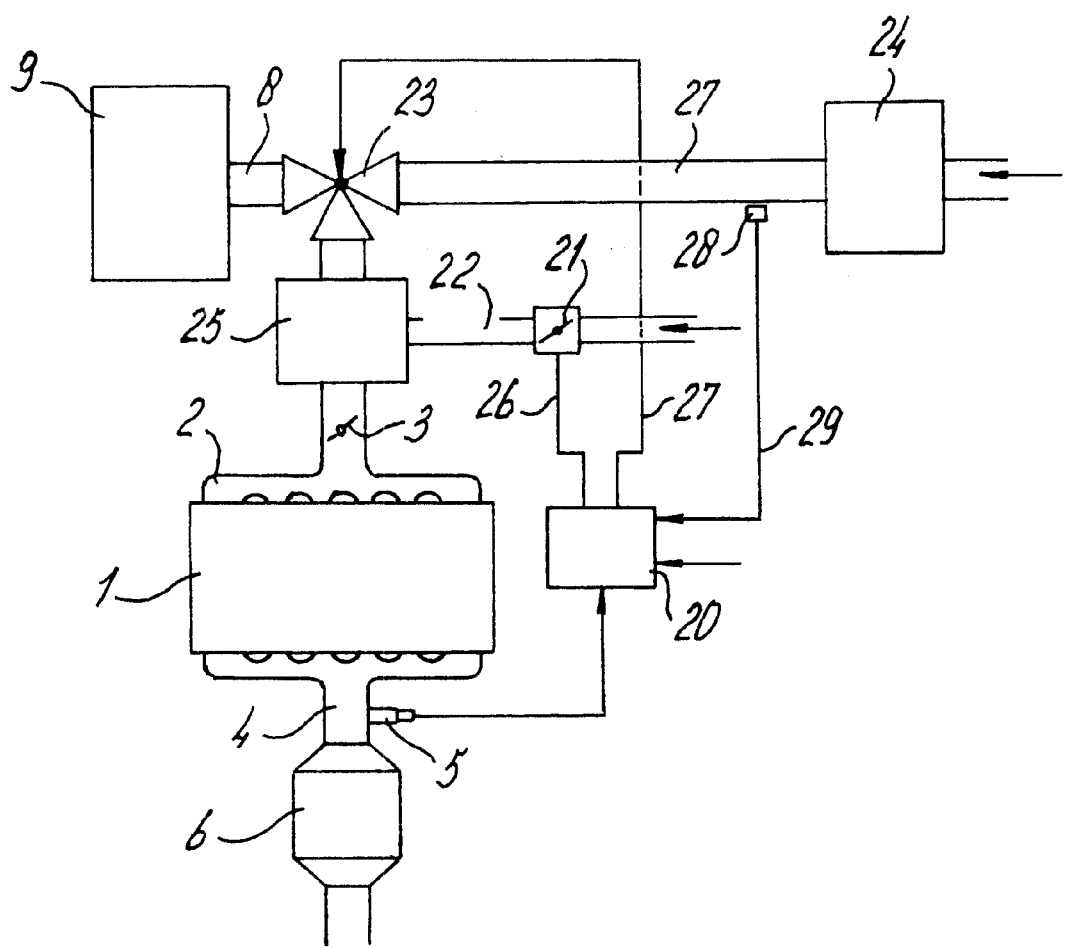
FIG. 1 provides a highly diagrammatic depiction of an embodiment of the invention.

In FIG. 1, an internal-combustion engine is denoted overall by 1. It is provided with an inlet manifold 2, upstream of which a throttle valve 3 is arranged. This throttle valve 3 depends on the type of engine and is designed to keep the speed and/or the load of the combustion engine constant. The exhaust of the combustion engine 1 is denoted by 4, and an exhaust-gas sensor, more particularly a so-called $\lambda$ sensor 5, is present. A catalytic converter 6 is arranged downstream of this exhaust-gas sensor.

An auxiliary fuel is introduced with the aid of line 22. The amount of auxiliary fuel is regulated by a control valve 21 which is regulated with the aid of control unit 20 and line 26. The auxiliary fuel may be introduced into the inlet duct of the combustion engine in any way which is known in the prior art. If the auxiliary fuel is a gas, a mixer 25, such as a venturi mixer, can be used for this purpose. It will be understood that if a liquid is used, injectors and the like can be employed.

The supply of a primary gas flow is denoted by 27. This gas flow may, for example, be derived from a chemical installation and may firstly fluctuate in terms of quantity and secondly may fluctuate in terms of composition. Composition primarily means the air/fuel ratio. This fuel will generally comprise gaseous components which are to be discharged in an environmentally friendly manner.

Control unit 20 is connected, via line 29, to a detector 28 in the supply for primary fuel, in order to detect whether or not vapour is present. 24 denotes a buffer in the supply for primary fuel.

The supply of primary fuel is realized with the aid of a three-way valve denoted by 23. Downstream, this valve is connected to the inlet of the internal combustion engine, and upstream it is also connected to the air inlet 8 and the air filter 9. In the situation outlined above, in which the mixture emanating from line 27 is stoichiometric, the three-way valve will block the supply of air via line 8, with the result that it is no longer necessary to supply auxiliary fuel, since the mixture supplied to the combustion engine is precisely stoichiometric or, if the mixture from line 27 is substoichiometric, only a small amount of secondary fuel has to be supplied via valve 21.

Figure 2A:
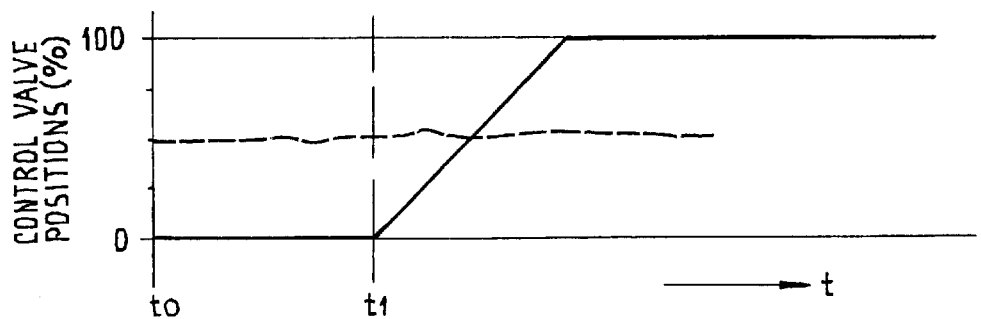
FIG. 2 shows graphs illustrating various operating conditions of the combustion engine as a function of the primary gas flow supplied and the position of the three-way valve shown in FIG. 1.
Figure 2B:
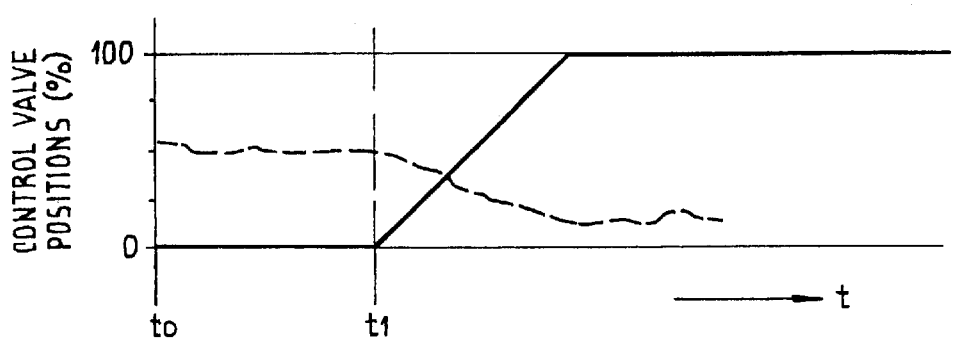
Figure 2C:
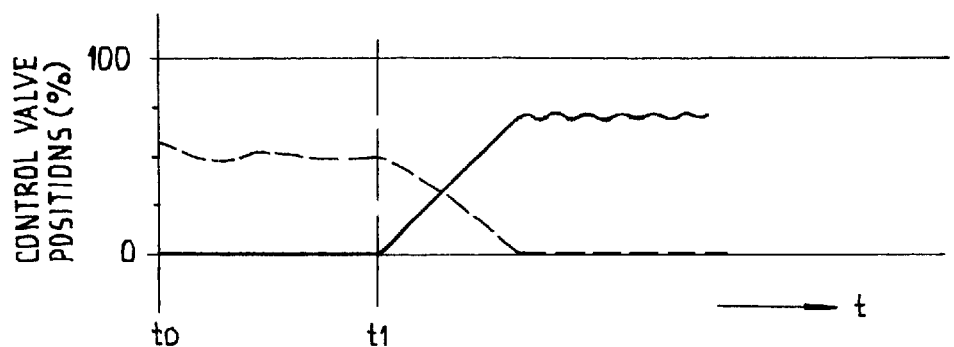

The way in which the system shown in FIG. 1 is illustrated further by means of the graphs shown in FIG. 2. The amount of gas allowed to pass through is indicated on the vertical axis in FIGS. 2a–c. The amount of primary gas is indicated by a solid line, while the amount of auxiliary fuel is indicated by a dashed line.

The time is indicated on the horizontal axis.

At time t0, the internal-combustion engine is started up, the three-way valve 23 being switched in such a manner that no gas from line 27 is allowed to enter the internal-combustion engine. Detector 28 is used to determine whether such a gas is present. At time t0, the engine is running only on secondary fuel, as indicated by the dashed lines. At time t1, the presence of gas in the primary line is observed.

In FIG. 2a, this vapour or gas consists substantially of air. The three-way valve 23 is controlled in such a manner that the air supply is closed and air is taken only from line 27. Of course, the amount of auxiliary fuel remains unchanged.

In the operating situation shown in FIG. 2b, although the primary gas does contain fuels, they are not present in a sufficient quantity to provide full operation of the combustion engine. In this case, as in FIG. 2a, the air supply is closed completely and the mixture which is too lean is supplied to the combustion engine. It is necessary to supply auxiliary fuel, but the amount required is less than in FIG. 2a.

Finally, FIG. 2c shows the situation in which the primary gas contains more fuel than would be required for a stoichiometric mixture. In the first instance, when the presence of gas in the line 27 is detected, the three-way valve is controlled in such a manner that the line 27 is opened and is connected to the internal-combustion engine and the air supply via inlet 8 is closed. At the same time, the supply of auxiliary fuel is reduced. If the supply of auxiliary fuel has reached its minimum level, i.e. zero, the closed regulating circuit switches over to, in this case, the three-way valve 23. The ratio of air supplied through inlet 8 and gas through line 27 is controlled in such a manner that a stoichiometric mixture is obtained. The oscillating right-hand part of FIG. 2c indicates this regulating.

It will be understood that the three-way valve 23 may be replaced by two valves; one valve in inlet 8 and one valve in line 27. Further changes to the systems described above will be clear to those skilled in the art. The systems described above are simply exemplary embodiments of the inventive concept as described in the appended claims.

What is claimed is:

1. A fuel supply system for a throttle-controlled internal combustion engine, comprising:

an inlet pipe for supplying an air/fuel mixture to the engine;

a throttle valve disposed in said inlet pipe;

a first feed line for supplying a primary fuel to the engine;

a second feed line including a first control valve for supplying a secondary fuel to the engine;

an air inlet duct including a second control valve for feeding air to the engine;

said first feed line, said second feed line, and said air inlet duct being connected to said inlet pipe upstream of said throttle valve;

sensor means for determining combustion conditions of the internal combustion engine; and said sensor means being operatively connected to a control unit which controls the first control valve and the second control valve.

2. The fuel supply system according to claim 1, wherein a third control valve is arranged in the first feed line for supplying the primary fuel.

3. The fuel supply system according to claim 1, wherein the second control valve is a three-way valve.

4. The fuel supply system according to claim 1, wherein the engine has an exhaust and the sensor means comprise a λ sensor which is arranged in said exhaust.

5. Method for preparing an air/fuel mixture which is to be administered to a throttle-controlled internal combustion engine having an inlet pipe with a throttle valve arranged in said inlet pipe, the method comprising:

supplying a flow mixture comprising an irregular supply of primary fuel, an air flow, and optionally a secondary auxiliary fuel to the internal combustion engine by metering the flow mixture via the throttle valve of the inlet pipe;

determining combustion conditions of the internal combustion engine by a sensor;

regulating the supply of secondary auxiliary fuel based on the combustion conditions determined by the sensor; and separately regulating the air flow supply by said sensor.

6. The method according to claim 5, wherein the flow of primary fuel to said combustion engine is separately regulated.

7. The method according to claim 5, wherein the regulating is carried out in such a manner that the supply of secondary auxiliary fuel is limited as far as possible, and the flow of primary fuel is as far as possible not restricted.

* * * * *